US006975697B2

(12) United States Patent
Kasperl et al.

(10) Patent No.: US 6,975,697 B2
(45) Date of Patent: Dec. 13, 2005

(54) APPARATUS AND METHOD FOR ESTABLISHING A CORRECTION CHARACTERISTIC CURVE FOR A REDUCTION OF ARTEFACTS IN TOMOGRAPHY

(75) Inventors: Stefan Kasperl, Erlangen (DE); Ulf Hassler, Heilsbronn (DE); Ingo Bauscher, Nuremberg (DE); Stefan Schroepfer, Oberasbach (DE)

(73) Assignee: Fraunhofer-Gesellschaft zur Foerdering der Angewandten Forschung e.v., Munich (DE)

( * ) Notice: Subject to any disclaimer, the term of this patent is extended or adjusted under 35 U.S.C. 154(b) by 0 days.

(21) Appl. No.: 10/498,291

(22) Filed: Jun. 4, 2004

(65) Prior Publication Data

US 2005/0013404 A1    Jan. 20, 2005

Related U.S. Application Data

(63) Continuation of application No. PCT/EP03/00683, filed on Jan. 23, 2003.

(30) Foreign Application Priority Data

Jan. 24, 2002  (DE) ................................ 102 02 732

(51) Int. Cl.[7] .............................................. A61B 6/03
(52) U.S. Cl. ............................. 378/4; 378/18; 378/22
(58) Field of Search ............................ 378/4, 7, 8, 15, 378/18, 22, 901; 382/274, 275

(56) References Cited

U.S. PATENT DOCUMENTS

| 5,095,431 A | 3/1992 | Feldman et al. ....... 364/413.13 |
| 5,953,444 A | 9/1999 | Joseph et al. ............... 382/131 |
| 6,035,012 A | 3/2000 | Hsieh ............................ 378/4 |
| 6,430,252 B2 | 8/2002 | Reinwand et al. ............. 378/8 |

FOREIGN PATENT DOCUMENTS

DE    100 36 142    7/2000    ............ A61B 6/03

OTHER PUBLICATIONS

De Man, B., J. Nuyts, P. Dupont, G. Marchal, and P. Suetens; *An Iterative Maximum-Likelihood Polychromatic Algorithm for CT*; 2001, IEEE.

Goebbels, J., O. Haase. B. Illerhaus, H. Riesemeier, B. Bailey, and M. Sene; *Korrektor der Strahlaufhaertung in der Computeromographie unter Verwendung simulierter und realer Objektdaten*; 1999; NDTnet.

Nalcioglu, N. and R. Lou; *Post-reconstruction Method for Beam Hardening in Computerised Tomography*; 1978, The Institute of Physics.

*Primary Examiner*—David V Bruce
(74) *Attorney, Agent, or Firm*—Michael A. Glenn; Glenn Patent Group

(57) ABSTRACT

An apparatus and method for establishing a correction characteristic curve for a reduction of artefacts in a tomography are described. Projection data of the object is provided, wherein the projection data comprises transmission values for the object. A representation of the object is calculated from the projection data to obtain two or three-dimensional representation data for the object. A measure for the transmission length of the object is determined by using the representation data. A transmission value, which is associated to the determined measure for the transmission length, is determined and the correction characteristic curve of several determined measures is generated for transmission lengths and associated transmission values, wherein a precorrection of the projection data can be performed by using the determined correction characteristic curve, to iteratively determine the correction characteristic curve by using the precorrected transmission values.

16 Claims, 3 Drawing Sheets

APPARATUS AND METHOD FOR ESTABLISHING A CORRECTION CHARACTERISTIC CURVE FOR A REDUCTION OF ARTEFACTS IN TOMOGRAPHY

CROSS-REFERENCE TO RELATED APPLICATIONS

This application is a continuation of copending International Application No. PCT/EP03/00683, filed Jan. 23, 2003, which designated the United States and was not published in English.

BACKGROUND OF THE INVENTION

1. Field of the Invention

The present invention relates to tomographic methods and particularly to the ray hardening correction in the two- or three-dimensional computer tomography.

2. Description of the Prior Art

In computer tomography, different physical effects cause artefacts in the reconstructed tomograms, which partly significantly decrease the image quality. To be able to perform measuring tasks with the desired precision and in an automated way, computer tomography reconstructions (CT reconstructions) have to be as artefact-free as possible.

Computer tomography methods are known in the art. A radiation source radiates through an object. The radiation passing through the object is weakened in its intensity depending on the length and absorption properties of the object in the optical path. A detector, which detects transmission values, i.e. the intensity of the radiation, which has passed through the object, is disposed behind the object. Typically, the detector is designed as two-dimensional pixel detector, which provides a two-dimensional transmission picture of the object on the output side, wherein the intensity of the radiation passing through the object depends both on the absorption properties of the object, which can vary over the path of the radiation through the object, and on the transmission length of the object.

Typically, an X-ray radiation source is used as radiation source. As it is known, computer tomography works on the basis of transmission images. A computer tomographic image consists of a sequence of projections, wherein the object is radiated through in a certain position, whereupon the transmission direction is altered, for example by 1 degree, to record another projection, etc. Thus, a computer tomographic image comprises a sequence of projections, wherein a rotation angle and general geometry data, respectively, are associated to every projection, wherefrom it can be derived how the position of the object has changed from one projection to the next. Additionally, every projection comprises a two-dimensional array of transmission values, which are typically intensity values.

Depending on the desired application, for example 360 projections can be recorded, when the object is always rotated by 1 degree between two projections. Depending on the application case, however, significantly more or significantly less projections are possible. The individual projection are then, as it is known, processed with reconstruction methods, such as filtered reprojection, to generate three-dimensional volume data, which consist of a plurality of volume elements or voxels. Typically, in a three-dimensional computer tomography, a value is associated to every voxel, from which can be seen which absorption density the respective element has at this location.

The three-dimensional computer tomography is not only applied in the medical field, but particularly in the industrial quality control of devices under tests with regard to quantitative statements, such as measuring tasks. One of the most import application cases is the production of cast parts in the automobile industry. The quality control of cast parts comprises mainly finding of defects and testing of dimensions. Main tasks in the preseries development are the fast checking of the dimensional stability of cast parts with complex geometry as well as the analysis of deviations of the geometry data from required data contained in a part plan.

Under the aspect of industrial applicability in comparison to other sources (synchrotron or gamma radiator) X-ray tubes are preferably used as radiation sources. Instead of a line detector in the two-dimensional computer tomography, a flat X-ray detector is used in the three-dimensional computer tomography. The three-dimensional computer tomography requires only one rotation of the object for reconstruction, whereby measuring times are significantly reduced compared to two-dimensional computer tomography.

However, the X-ray tubes used in computer tomography emit polychromatic radiation. The interaction of the polychromatic X-ray radiation in the transmission through the matter is energy-dependent. Real system characteristic curves, which associate an intensity value to a transmission length, have thus a nonlinear curve, caused by effects like ray hardening, compton scattering and nonlinearities of the detector. This causes artefacts, such as stripes, unsharp edges, ton shaped drawings and so-called cupping effects in the reconstructed object illustration, which decrease the image quality and impede or even prevent measuring tasks.

A simple and common correction method in computer tomography is the usage of a prefilter, which operates as frequency high pass filter. Thereby, the energy spectrum of the X-ray radiator is limited to higher energies. More costly correction methods determine the nonlinear curve of the characteristic curve by measurements at reference objects from the same material as the object under test, wherein step wedges are preferred. A step wedge consists of portions of different thickness, wherein the respective thickness of the portions is exactly known. A projection of the step wedge provides a transmission value for every known thickness, so that the system characteristic curve, which indicates the connection between transmission value (intensity or weakening reciprocal to intensity with reference to a reference intensity value) and transmission length, can be generated by the reference object. In this system characteristic curve, which is generated by the reference object, influences of both the radiator and the detector are taken into consideration.

After a calibration method for determining the system characteristic curve of a radiator/detector system by using the reference object, the established system characteristic curve will then be stored and used in a subsequent measuring process to subject projection data generated from a object under test to a precorrection, to perform a three-dimensional reconstruction based on the projection data precorrected according to the system characteristic curve, in order to generate volume data, based on which the density of the object under test can be read in dependency on the position in the object under test.

The reference object method is disadvantageous in such that first a reference object has to be introduced into the system of radiator and detector to calibrate the system. Above that, a defined reference object is required, whose density is specified. If, however, the material density of the objects under test deviates from the density of the reference object, the system characteristic curve might no longer be correct.

In the article for the annual meeting 1998 of the German society for destruction free testing (Deutsche Gesellschaft für eine zerstörungsfreie Prüfung), Bamberg, Sep. 7 to 9, 1998, entitled "Korrektur der Strahlaufhärtung in der Computertomographie unter Verwendung simulierter und realer Objektdaten", O. Haase et al. a method is sketched, which utilizes knowledge about geometry and material composition of the object under test to enable a ray hardening correction without test body. The geometry data of the object are either determined by simulation of the real object or from the reconstructed image matrix itself. For a predetermined material composition, the weakening in the object is calculated and thus, the measured weakening values are corrected. The calculation of the weakening is performed with a Monte-Carlo method, the EGS4 code, wherein both the energy spectrum of the utilized X-ray radiator and the properties of the detector are taken into consideration. The weakening coefficients of the elements are taken from literature tables.

This concept for ray hardening correction does not require a reference object, but predetermined material compositions, the spectrum of the utilized X-ray radiator and the properties of the detector as well as weakening coefficients of elements from literature tables. This leads to the fact that the method does not have the required flexibility in certain applications, namely when not all required information is present.

SUMMARY OF THE INVENTION

It is the object of the present invention to provide a more flexible concept for establishing a correction characteristic curve for a reduction of artefacts in tomography.

In accordance with a first aspect, the present invention provides an apparatus for establishing a correction characteristic curve for a reduction of artefacts in a tomography, having means for providing projection data of an object consisting of a single material, wherein the projection data comprise transmission values for the object which comprise weakening values or intensity values; means for calculating a representation of the object from the projection data to obtain representation data for the object, wherein the representation data are two-dimensional or three-dimensional data, wherein means for calculating is formed to first convert the weakening values or intensity values to transmission lengths, by using a predetermined default characteristic curve to be corrected, to obtain converted transmission lengths, and to calculate the representation data from the converted transmission lengths; means for determining a measure for a transmission length of the object by using the representation data; means for determining a transmission value, which is associated to the determined measure for the transmission length; and means for generating the correction characteristic curve of several determined measures for transmission lengths and associated transmission values, wherein the correction characteristic curve comprises an association of weakening or intensity values to transmission lengths and thus represents a corrected version of the default characteristic curve.

In accordance with a second aspect, the present invention provides a method for establishing a correction characteristic curve for a reduction of artefacts in tomography, having the following steps: providing projection data of an object consisting of a single material, wherein the projection data comprise transmission values for the object, which comprise weakening values or intensity values; calculating a representation of an object from the projection data, to obtain representation data for the object, wherein the representation data are two-dimensional or three-dimensional data, wherein in the step of calculating, first, the weakening values or intensity values are converted to transmission lengths by using a predetermined default characteristic curve to be corrected, to obtain converted transmission lengths, and wherein then the representation data are calculated from the converted transmission lengths; determining a measure for a transmission length of the object by using the representation data; determining a transmission value, which is associated to the determined measure for the transmission length; and generating the correction characteristic curve of several determined measures for transmission lengths and associated transmission values, wherein the correction characteristic curve comprises an association of the weakening or intensity values to transmission lengths, and thus represents a corrected version of the default characteristic curve.

The present invention is based on the knowledge that the correction curve can be generated from the object under test itself, which consists of a material, by generating first an artefactive volume representation without providing a certain system characteristic curve or by using an ideal linear system characteristic curve, from which then transmission lengths and associated transmission values are determined, preferably by binarization of the typically three-dimensional reconstruction data, from which a first correction characteristic curve is generated. This correction characteristic curve generated from the artefactive three-dimensional illustration of the object can then be used to subject the projection data to a precorrection, to obtain precorrected projection data, from which then a further—as has been found out—significantly less artefactive three-dimensional volume radiation of the object can be obtained.

If this three-dimensional volume representation is already significantly artefact free, the inventive concept only has to be performed once. If, however, it is found out that the artefacts are not yet sufficiently eliminated, it is preferred to iteratively improve the correction characteristic curve by calculating again transmission lengths and associated transmission values from the artefact-reduced volume representation of the object, to generate—so to speak—a corrected correction characteristic curve, which is then used again in a next run for precorrection of the projection data, to obtain a more artefact-reduced volume representation of the object.

This iteration loop can be repeated up to a certain termination criterion, so that finally, the correction characteristic curve for a detector/radiator system is generated merely based on the object under test itself, without information about the radiator, the detector or other things and particularly without reference object, wherein the correction characteristic curve can then be used after this calibration iteration for quantitively detecting objects under test in a measurement run.

It should be noted that the characteristic curve is used to establish transmission lengths associated to the weakening values from the projection data of a cut image, which comprises at first only weakening values and intensity values, respectively, at geometrical positions. These transmission lengths, which are determined by the characteristic curve from the weakening values, are then used in a normal CT reconstruction process to obtain the representation data.

The present invention is advantageous in that merely the raw data, i.e. the projection data itself are required for generating the correction characteristic curve. Particularly, no reference object is required.

It is another object of the present invention, that the inventive concept does not require any knowledge about the geometry or the material composition of the device under test or information about the energy spectrum of the utilized X-ray radiation source.

In this context, it should be noted that a characteristic curve is based, on the one hand, on the material of the object, and, on the other hand, on the spectrum and properties, respectively, of the utilized X-ray source. For a correct reconstruction, a correct characteristic curve is required, which is also referred to herein as correction characteristic curve.

While so far both the radiation source had to be measured and the material and the absorption coefficient of the material, respectively, had to be known a priori for the utilized X-ray spectrum, which both enter the correction characteristic curve, according to the present invention, the correction can be determined without knowledge of the material of the object, which consists of a single material, and without knowledge of the spectrum of the radiation source. Since both quantities enter the correction characteristic curve, however, the absorption coefficient of the material or the spectrum of the radiation source cannot be inferred easily from the inventively obtained correction characteristic curve. However, this is not problematic, since for an artefact reduced tomography illustration merely a correction characteristic curve is required, but not the two above-mentioned pieces of information separately from one another.

Due to the fact that the above named pieces of information are not required separately from one another, the inventive concept can be used flexibly. This flexibility eliminates the problems in that the mixing ratio of the alloy varies slightly in devices under test, which leads to inexact knowledge of the material composition, so that system correction characteristic curves, which are based on the material composition, can result in artefactive reconstructions.

Above that, it has shown to be problematic to simulate a real energy spectrum. Simulated energy spectrums always have a certain deviation to the real spectrum, so that even a system characteristic curve generated based on a simulated energy spectrum is inherently defective. In the inventive concept, however, this information is not required, so that it can also not lead to error sources in the correction characteristic curve.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
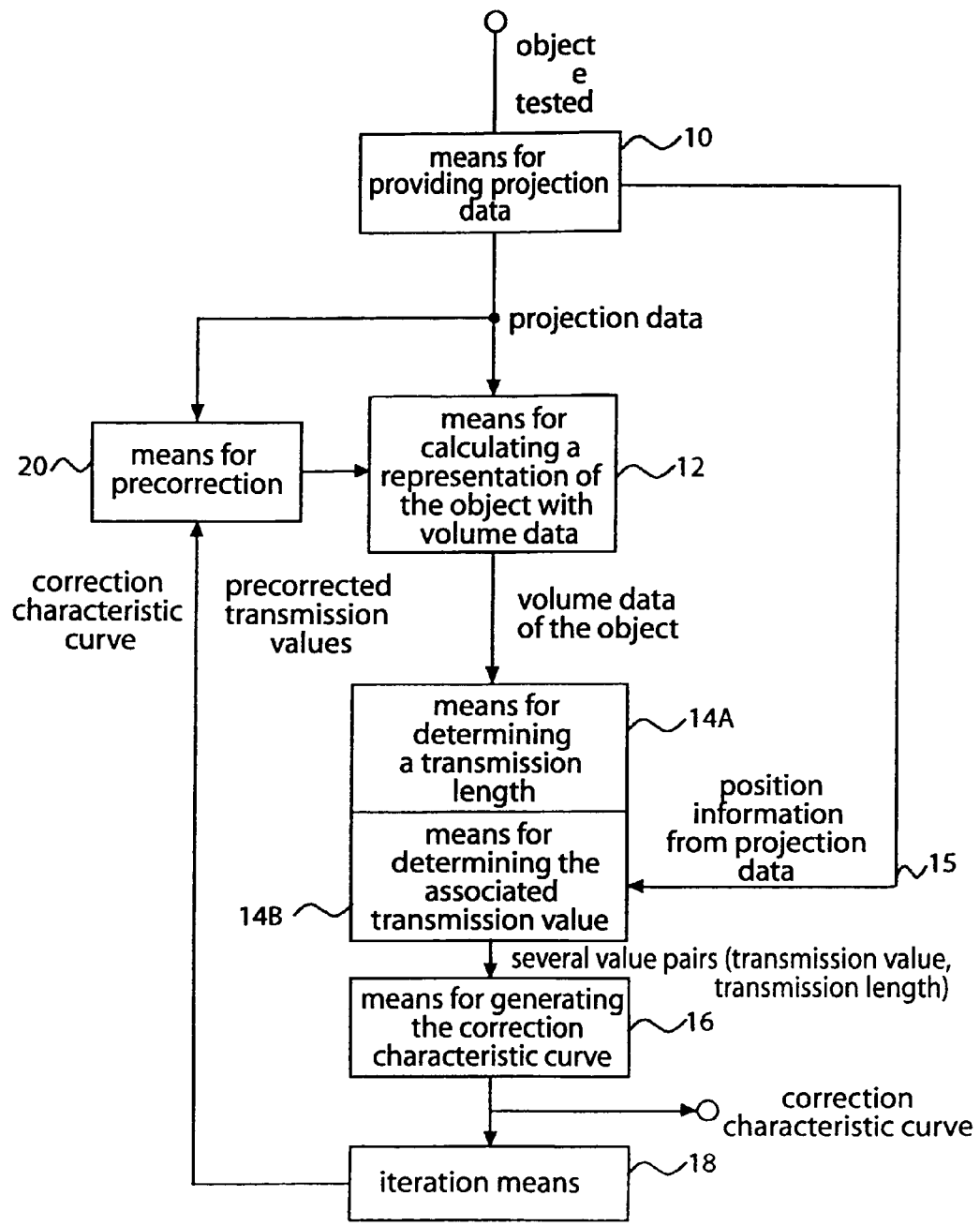
FIG. 1 is an overview diagram for the inventive method and the inventive apparatus.
Figure 2:
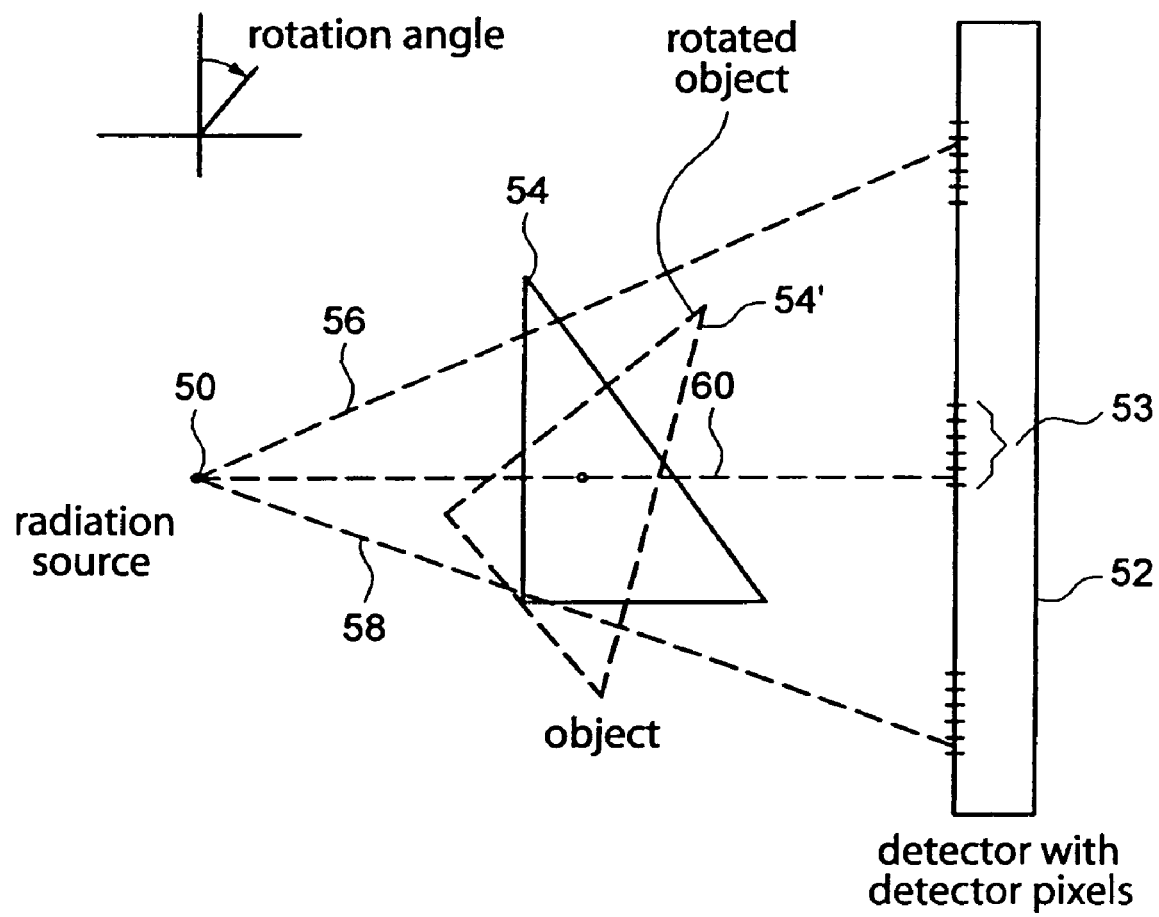
FIG. 2 is a sketch of the radiation source/detector system with an object.

First, the overview diagram in FIG. 1 comprises means 10 for providing projection data of an object under test. Means 10 for providing projection data can either be a radiation source/detector system itself shown in FIG. 2, from which the projection data are measured directly and then output, to generate the inventive correction characteristic curve, or means 10 for providing projection data can be a storage medium were previously detected projection data of an object are stored. Before further reference is made to FIG. 1, reference is first made to FIG. 2. FIG. 2 shows a sketch of a radiation source/detector system with a radiation source and a detector 52, wherein an object 54 is disposed between the detector 52 and the radiation source 50. It should be noted that the radiation source in three-dimensional computer tomography is a radiation source radiating in a space cone. The object 54 is a three-dimensional object, which is shown as a triangle in cross section in the schematic representation in FIG. 2. In three-dimensional computer tomography, the detector 52 is a flat detector with a two-dimensional array of pixels 53, which are merely schematically indicated in FIG. 2.

The system shown in FIG. 2 operates such that the object 54 in the position shown in FIG. 2 indicated by continuous lines, is brought between radiation source and detector, wherein a projection of the object 54 is generated at the detector. Different rays of the point shaped assumed radiation source 50 have different transmission lengths and are thus weakened differently strong. Thus, the two rays 56 and 58 have merely a very small transmission length through the object, while a medium ray 60 has a significantly larger transmission length through the object 54. The projection of the object 54 in its position shown in crossed-out lines, is provided together with an information that the object had a rotation of, for example, 0° in this projection. Thereupon, the object is rotated by a certain rotation angle, so that a rotated object 54' is between the radiation source and the detector. Then, again a projection of the now rotated object is recorded and provided with position information, which indicate the rotation angle of the object 54' in comparison to its original position (object 54 in solid lines in FIG. 2). In three-dimensional computer tomography, it is sufficient to record several projections of the object rotated from projection to projection, until the object is rotated by 360°. Depending on the desired measurement accuracy, the object can be rotated, for example by 1°, from projection to projection. However, rotation angles smaller than 1° and larger than 1°, respectively, are also used, depending on desired requirement.

The projections with associated position information form together the projection data of an object, which can, for example, be stored in an appropriate format favorable for further processing. It should be noted that every projection in the three-dimensional computer tomography comprises a two-dimensional array of pixels. The projection data, which are generated by the system illustrated in FIG. 2, are also referred to as raw data.

In the following, reference will be made again to FIG. 1, to illustrate the inventive determination of the correction characteristic curve without reference object or additional information.

The projection data are first fed into means 12 as raw data for calculating a representation of the object to obtain volume data for the object. It is preferred to provide the volume data in form of voxels, i.e. volume elements. Means 12 can operate according to any known method for reconstructing an object of computer tomography projection.

From the volume data of the object, which are, of course, still artefactive, since no artefact correction has been performed, now, a set of several value pairs is generated via means 14a for determining a transmission length and by using means 14b for determining the transmission value associated to a determined transmission length, wherein every value pair comprises both a transmission value, i.e. an intensity value, and a transmission length.

Means 14a for determining a transmission length determines the distance between an entry point of a ray into the volume data and an exit point of the ray from the volume data, wherein this distance can, for example, be estimated by counting the voxels present between the two points. This estimation is, however, only exact when the ray passes diagonally through every voxel. This is, however, only the case for certain rays. However, more exact methods for calculating the shortest distance between the two voxels, i.e. entry voxel and exit voxel, are known in the art.

It should be noted that the above considerations are exactly applicable for the case where a homogenous filled body is present, where a single entry point and a single exit point are present for a ray. If, however, a hollow cylinder is considered, the ray has an entry point, an exit point, another entry point and again an exit point. The transmission length is then merely the distance from the first entry point to the first exit point and the distance from the second entry point to the second exit point. Means 14a is thus formed such that the voxels hit by a ray enter the measure for the transmission length with different weightings. One example for the weighting would be that the pixels between the first entry point and the first exit point are weighted by the factor "1", while the pixel between the first exit point and the second entry point are weighted by the factor "0". Further weightings are possible.

Means 14b is formed to continue the ray, whose transmission length has been determined by the volume through means 14a—vividly spoken—towards the detector, to determine a certain detector pixel, whose intensity value is to be associated to the transmission length determined by means 14a. Since the determined pixel, however, has an individual intensity value for every projection of the object, means 14b determines also for which projection from the projection data the considered ray has the calculated transmission length. This is performed on the base of position information, which is associated to the individual projections, so that means 14b obtains position information from the projection data over branch 15, so that the correct transmission value is associated to a certain transmission length, which a ray had through the object, which has been indicated by the detector when generating the projection data, as has been discussed in FIG. 2.

Depending on the desired precision for the correction characteristic curve, means 14a and 14b are formed to generate several value pairs (transmission value; transmission length). These several value pairs are now fed into means 16 for generating the correction characteristic curve. Means 16 for generating the correction characteristic curve can be formed in different ways. When enough value pairs are present, it could, for example, perform an interpolation between the value pairs and store the value pairs themselves as well as value pairs calculated by interpolation in a predetermined resolution in tabular form. Alternatively, means 16 for generating a correction characteristic curve can be formed to adapt an analytical function to the value pairs, for example by using a fitting algorithm known in the art.

Thus, at the output of means 16, a correction characteristic curve exists either in form of a table or in form of an analytical function, which can already be used as calibration curve for a subsequent measurement run, depending on artefact strength and condition of the radiation source/detector system. Although the inventive concept shows a fast convergence, such that already the first determined correction characteristic curve is an often useful approximation to the required correction characteristic curve, it is preferred to determine the correction characteristic curve iteratively.

Thereby, as it is shown in FIG. 1, an iteration means 18 is provided, which performs a precorrection of the projection data via means 20 for precorrection by using the correction characteristic curve output by means 16, to generate precorrected transmission values, which are then fed into means 12 instead of the original projection data. In the following iteration run, means 12 as well as means 14a, 14b and 16 perform the same calculations as in the first run, but now no longer by using the original projection data, which are provided by the means, but by using the precorrected projection data and precorrected transmission values, respectively, which are provided by means 20.

After a first iteration run, a corrected correction characteristic curve results at the output of means 16, which can be further improved, if desired, via a further iteration or several further iterations controlled by iteration means 18, or which can already be used as calibration system characteristic curve.

In a preferred embodiment of the present invention, the iteration method is repeated until a termination criterion for the iteration is fulfilled. A termination criterion can, for example, be the change of the corrected correction characteristic curve in comparison to the correction characteristic curve from the previous iteration run. A further termination criterion can be generated by using the volume data, which are generated by means 12.

Thus, it is preferred for that termination criterion, to compare the volume data of a first run to the volume data of a second run, and to determine how many voxel, i.e. volume elements, have changed from the one run to the next run. If this number of changed voxels is below a predetermined threshold, the termination criterion is considered as fulfilled. If, however, the number is above a predetermined threshold, a further iteration run is performed.

Figure 3:
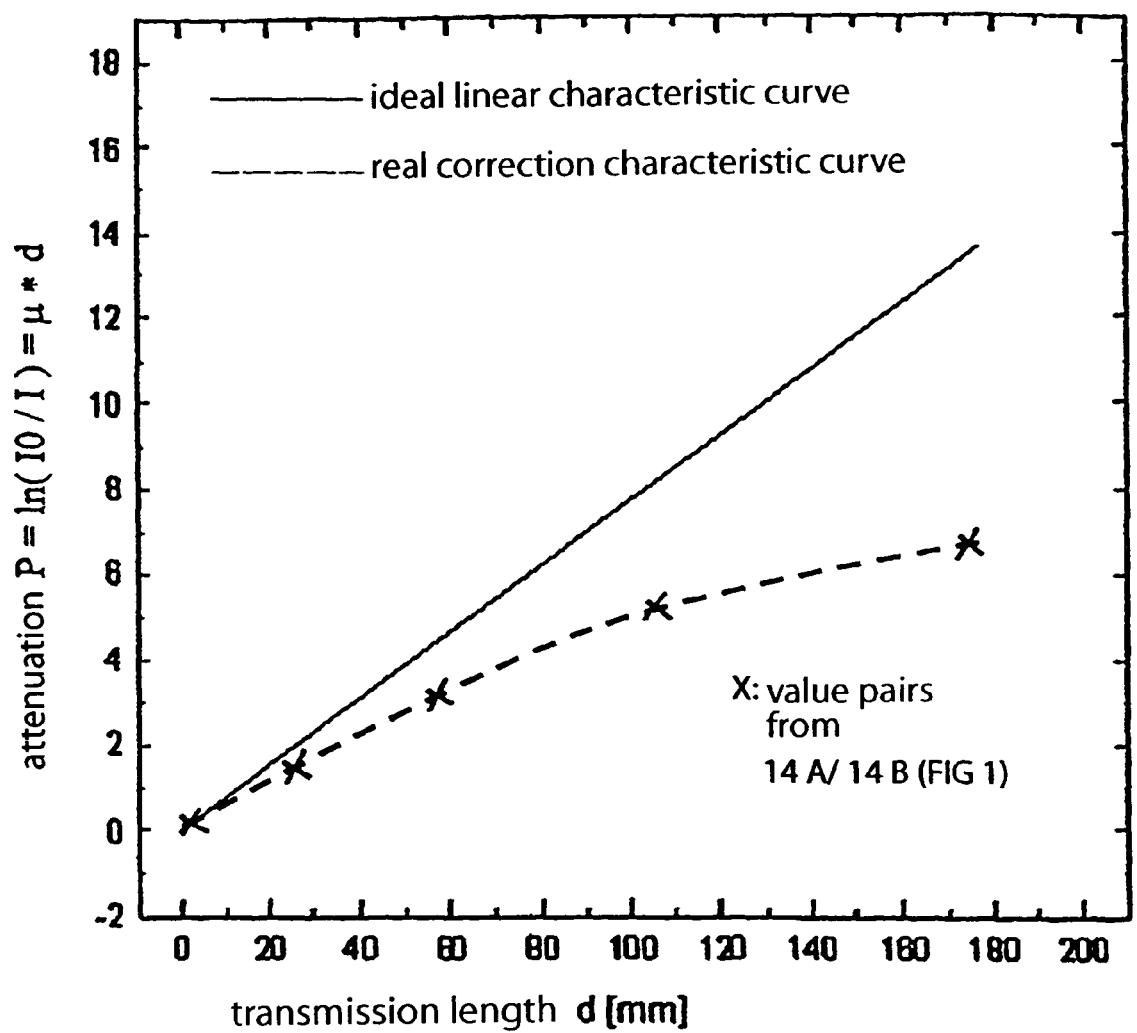
FIG. 3 is a comparison of an ideal linear characteristic curve and an inventively generated real correction characteristic curve for precorrection purposes.

In FIG. 3, the logarithmic weakening of intensity I with regard to a reference intensity IO is applied along the ordinate, which is, in the ideal case, equal to the product of transmission length d and absorption coefficient $\mu$. However, it should be noted that also the intensity could be applied over the transmission length. In the sense of the present invention, the expression "transmission value" comprises, for example, the intensity directly (the characteristic curve would then be falling) or the weakening, which is derived from the intensity or any other quantity, which can be derived from the intensity.

An ideal linear system characteristic curve is compared to a real system characteristic curve (correction characteristic curve). The ideal characteristic curve has a linear monotonously increasing course, wherein a lower attenuation value P (corresponds to a high intensity at the detector) is associated to a short transmission length, and wherein a high attenuation value is associated to a high transmission length.

A real correction characteristic curve has a different course due to the physical effects when recording projection data, wherein the deviation between the correction characteristic curve and the ideal characteristic curve is used to perform a precorrection (FIG. 1) of the projection data in means 20, as it is known in the art.

If the correction characteristic curve, which is illustrated in FIG. 3, is, for example, the correction characteristic curve, which is output from means 16 of FIG. 1 after a first run, means 12 has also used the ideal characteristic curve of FIG. 3 in the first run, i.e. has selected no correction, for calculating a representation of the object with volume data.

In order to improve the convergence of the inventive method, i.e. the quality of the correction characteristic curve after a first run through blocks 12, 14a, 14b and 16, already prior to the first calculation of a representation of the object with volume data, a predetermined correction characteristic curve can be used, which has, for example, been determined due to experimental values with a radiation source/detector system. This default can, however, limit the flexibility of the system and is only useful when experiences about the system exists, which is used under almost equal conditions, for example for testing similar cast parts. For the functionality of the method itself, however, no predetermined correction characteristic curve is required, but the projection data can be fed directly to means 12, which means without precorrection, in the first run, to generate more or less strongly artefactive volume data of the object.

When operating according to a known reconstruction algorithm, means 12 for calculating a representation of the object provides not only the volume data of the object but also data about the background of the object. To simplify the functionality of means 14a, it is preferred to segment the desired object from the tomograms, wherein a 3D edge finding operator is used for outline finding.

Now, a line tracking algorithm draws the found edges, to separate the object from the background.

Afterwards, a segmentation, such as a binarization, of the volume data of the object is performed, which consists of a single material. A binarization of the volume data can be taken into consideration when there are only two states in the volume, i.e. "material" or "no material".

So far, every volume element had an associated value, which indicates the absorption density. Since, however, means 14a does not require the density information, but merely the information whether a voxel is within the object or outside the object, a binarization of the volume data is now performed. The density information of all voxel data, which are within the object limits, are, for example, set to a logic "1", while the density information of all voxel data, which are outside the outline of the object, are for example set to "0". Thus, before it calculates the transmission length, means 14a generates first a binarized volume representation of the object, where the background is, for example, white, while the object itself is black. For the general case of segmentation, the density information is always set to one of more than two states.

Preferably, means 14a comprises a voxel based raytracer (ray tracing algorithm), which determines the way through the object for a ray from the point shaped assumed X-ray source to a detector pixel, and, for example, counts the pixel on the way of the ray through the object, which are set to "1", i.e. "material present". Means 14b determines then the detector pixel belonging to that ray, where the traced ray impinges and the intensity value from the projection associated to this ray determined by the position information. Thus, at the output of means 14a and 14b, a set of several value pairs results, wherein every value pair comprises a transmission value and a transmission length.

Preferably, means 16 for generating the correction characteristic curve operates such that it puts an optimized fit algorithm on the value pairs, wherein a physically plausible function is fitted by the determined value pairs.

A 3D canny operator is preferred for edge extraction. A so-called Levenberg Marquardt routine is preferred for function fitting in means 16. Of course, different edge operators or fitting algorithms can be used.

As has already been discussed, one or several iterations can be arranged by iteration means 18, wherein prior to every iteration run, a precorrection of the projection data is performed via means 20 by using the correction characteristic curve determined by means 16, such that the volume data at the output of means 12 are ideally less and less artefactive from iteration to iteration.

Both prior to the first reconstruction by means 12 for calculating and in further reconstructions, i.e. iterations, the weakening values contained in the projection data are converted according to a transmission length according to the procedure described in FIG. 3. In the first iteration, however, an arbitrary characteristic curve, such as the ideal linear characteristic curve illustrated in FIG. 3 is used for converting weakening values into transmission lengths, wherefrom then the representation data are determined with a common tomography reconstruction algorithm. From these representation data, the real correction characteristic curve will be determined, wherein it merely has to be considered that not only one value pair but several value pairs usefully distributed across the assumed area of transmission lengths are determined. In the second iteration, if it is performed at all, the same projection data are used, which are obtained in means 10. The weakening values of these projection data are now converted to transmission lengths by using the determined real correction characteristic curve, which now lead to strongly artefact—reduced two- or preferably three-dimensional representation data.

Instead of the ideal linear characteristic curve illustrated in FIG. 3, any other not necessarily linear characteristic curve can be used, as long as it is chosen such that numerical limits of a used calculator are not hurt. In so far, a vertical or a horizontal characteristic curve has to be ruled out. Thus, a characteristic curve is preferred, which extends through the coordinate system shown in FIG. 3 in a reasonable way.

Although, a three-dimensional embodiment of the concept for establishing a correction characteristic curve has been referred to above, it should be noted that the concept can also be applied to two-dimensional data, which means area data instead of volume data as a form of representation data for the object.

In summary, the described invention is based preferably on an iterative improvement of the reconstructions without the help of a reference object, wherein further no other a priori information about the geometry or material composition of the device under test or information about the energy spectrum of the utilized X-ray source is required.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for establishing a correction characteristic curve for a reduction of artefacts in a tomography, comprising:

means for providing projection data of an object consisting of a single material, wherein the projection data comprise transmission values for the object which comprise weakening values or intensity values;

means for calculating a representation of the object from the projection data to obtain representation data for the object, wherein the representation data are two-dimensional or three-dimensional data, wherein means for calculating is formed to first convert the weakening values or intensity values to transmission lengths, by using a predetermined default characteristic curve to be corrected, to obtain converted transmission lengths, and to calculate the representation data from the converted transmission lengths;

means for determining a measure for a transmission length of the object by using the representation data;

means for determining a transmission value, which is associated to the determined measure for the transmission length; and means for generating the correction characteristic curve of several determined measures for transmission lengths and associated transmission values, wherein the correction characteristic curve comprises an association of weakening or intensity values to transmission lengths and thus represents a corrected version of the default characteristic curve.

2. Apparatus according to claim 1, further comprising:
iteration means, which is formed to
generate a renewed representation of the object by using the correction characteristic curve to obtain corrected representation data for the object;
determine several corrected measures for transmission lengths for the object and associated corrected transmission values by using the corrected representation data; and
generate a corrected correction characteristic curve of several determined corrected measures for transmission lengths and associated corrected transmission values;
wherein the iteration means is further disposed to terminate iteration if a predetermined termination criterion is fulfilled.

3. Apparatus according to claim 2, wherein the iteration means is formed to use a change under a predetermined changing threshold of the corrected representation data from one iteration step to a further iteration step as termination criterion.

4. Apparatus according to claim 3, wherein the representation data comprise voxel, and wherein the predetermined threshold can be determined based on the change of the total number of voxels in one iteration step to a further iteration step.

5. Apparatus according to claim 1,
wherein the means for calculating the representation of an object is formed to use a linear system characteristic curve in a first calculation of a representation.

6. Apparatus according to claim 1,
wherein the means for calculating is disposed to calculate a volume representation of the object with its background, and to detect edges of the object, based on which it can be clearly distinguished between the object and its background in the representation.

7. Apparatus according to claim 1,
wherein the means for determining a measure for a transmission length is formed to set representation data belonging to the object into at least a first state, and to set representation data of the representation of the object, which do not belong to the object but to the background, into a second state, which differs from the first state, to obtain a segmented representation data of the reconstruction.

8. Apparatus according to claim 7, wherein the means for determining is formed to set representation data, which belong to the object, into a plurality of states, to obtain a segmentation of the representation data of the object according to a weakening property of segments of the object.

9. Apparatus according to claim 1,
wherein the representation data have volume elements, and
wherein the means for determining a measure for a transmission length is formed to determine the measure for the transmission length based on a weighting of data elements hit by a ray between an entry point of the ray from a radiation source into the representation of the object to an exit point of the ray from the representation of the object, wherein the weighting can be performed based on a segmentation of the representation data for the object.

10. Apparatus according to claim 9,
wherein the means is disposed to use a ray tracing algorithm, which operates based on a ray emitted from a first point shaped radiation source, which extends from the radiation source to the object to a pixel of a detector.

11. Apparatus according to claim 1,
wherein the means for generating the correction characteristic curve is disposed to adapt a function to the several determined measures for transmission lengths and associated transmission values.

12. Apparatus according to claim 1, wherein the representation data are three-dimensional data and comprise voxel elements.

13. Apparatus according to claim 1, wherein the default characteristic curve is a linear characteristic curve with a predetermined slope.

14. Apparatus according to claim 1, wherein the default characteristic curve is chosen independent from a material composition of the object and/or independent of an energy spectrum of a utilized X-ray source.

15. Method for establishing a correction characteristic curve for a reduction of artefacts in tomography, comprising:
providing projection data of an object consisting of a single material, wherein the projection data comprise transmission values for the object, which comprise weakening values or intensity values;
calculating a representation of an object from the projection data, to obtain representation data for the object, wherein the representation data are two-dimensional or three-dimensional data, wherein in the step of calculating, first, the weakening values or intensity values are converted to transmission lengths by using a predetermined default characteristic curve to be corrected, to obtain converted transmission lengths, and wherein then the representation data are calculated from the converted transmission lengths;
determining a measure for a transmission length of the object by using the representation data;
determining a transmission value, which is associated to the determined measure for the transmission length; and
generating the correction characteristic curve of several determined measures for transmission lengths and associated transmission values, wherein the correction characteristic curve comprises an association of the weakening or intensity values to transmission lengths, and thus represents a corrected version of the default characteristic curve.

16. Method according to claim 15, further comprising:
precorrecting the projection data by using the correction characteristic curve; and
iteratively repeating steps of calculating, of determining a measure for the transmission length, of determining the associated transmission value and of generating the correction characteristic curve by using the precorrected projection data, until a termination criterion for the iteration is fulfilled.

* * * * *

UNITED STATES PATENT AND TRADEMARK OFFICE
CERTIFICATE OF CORRECTION

PATENT NO. : 6,975,697 B2  Page 1 of 1
APPLICATION NO. : 10/498291
DATED : December 13, 2005
INVENTOR(S) : Stefan Kasperl et al.

It is certified that error appears in the above-identified patent and that said Letters Patent is hereby corrected as shown below:

Title Page, Assignee should read:
(73)    Assignee:    Fraunhofer-Gesellschaft zur Foerderung der angewandten Forschung e.V., Munich (DE)

Signed and Sealed this

Sixteenth Day of December, 2008

JON W. DUDAS
*Director of the United States Patent and Trademark Office*